April 10, 1962 R. WADE ET AL 3,028,790
AUDIO-VISUAL APPARATUS
Filed Aug. 31, 1959 14 Sheets-Sheet 1

INVENTORS
ROGER WADE
JOHN C. NEMESNYIK
ROBERT BROWN
BY Kane Dalsimer and Kane
ATTORNEYS INVENTORS.
ROGER WADE
JOHN C. NEMESNYIK
ROBERT BROWN
BY Kane Dalsimer and Kane
ATTORNEYS April 10, 1962 R. WADE ET AL 3,028,790

AUDIO-VISUAL APPARATUS

Filed Aug. 31, 1959 14 Sheets-Sheet 3

INVENTORS
ROGER WADE
JOHN C. NEMESNYIK
ROBERT BROWN
BY
Kane, Dalsimer and Kane
ATTORNEYS INVENTORS
ROGER WADE
JOHN C. NEMESNYIK
ROBERT BROWN
BY
Kane, Dalsimer and Kane
ATTORNEYS April 10, 1962 R. WADE ET AL 3,028,790

AUDIO-VISUAL APPARATUS

Filed Aug. 31, 1959 14 Sheets-Sheet 5

INVENTORS.
ROGER WADE
JOHN C. NEMESNYIK
ROBERT BROWN
BY
Kane, Dalsimer and Kane
ATTORNEYS April 10, 1962 R. WADE ET AL 3,028,790

AUDIO-VISUAL APPARATUS

Filed Aug. 31, 1959 14 Sheets-Sheet 6

INVENTORS
ROGER WADE
JOHN C. NEMESNYIK
ROBERT BROWN
BY
Kane, Dalsimer and Kane
ATTORNEYS

AUDIO-VISUAL APPARATUS

Filed Aug. 31, 1959 14 Sheets-Sheet 7

INVENTORS
ROGER WADE
JOHN C. NEMESNYIK
ROBERT BROWN
BY Kane, Dalsimer and Kane
ATTORNEYS INVENTORS.
ROGER WADE
JOHN C. NEMESNYIK
ROBERT BROWN
BY Kane Dalsimer and Kane
ATTORNEYS INVENTORS.
ROGER WADE
JOHN C. NEMESNYIK
ROBERT BROWN
BY Kane Dalsimer and Kane
ATTORNEYS INVENTORS.
ROGER WADE
JOHN C. NEMESNYIK
ROBERT BROWN
BY Kane Dalsimer and Kane
ATTORNEYS

AUDIO-VISUAL APPARATUS

Filed Aug. 31, 1959 14 Sheets-Sheet 11

INVENTORS.
ROGER WADE
JOHN C. NEMESNYIK
ROBERT BROWN
BY Kane Dalsimer and Kane
ATTORNEYS INVENTORS
ROGER WADE
JOHN C. NEMESNYIK
ROBERT BROWN
BY Kane Dalsimer and Kane
ATTORNEYS FIG. 36
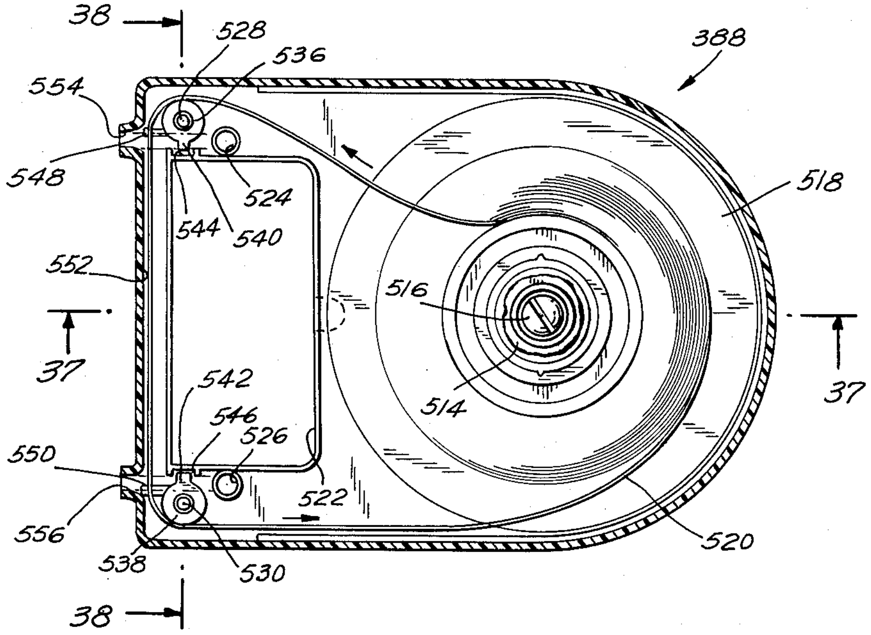
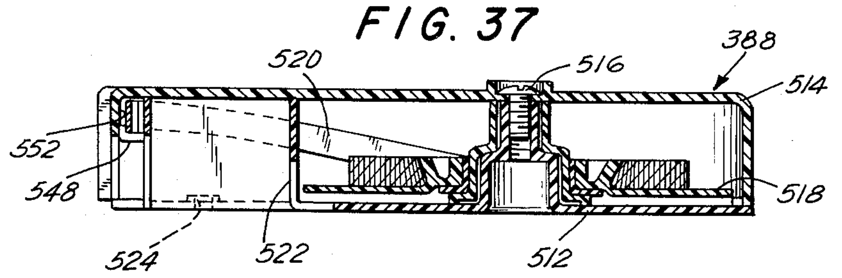
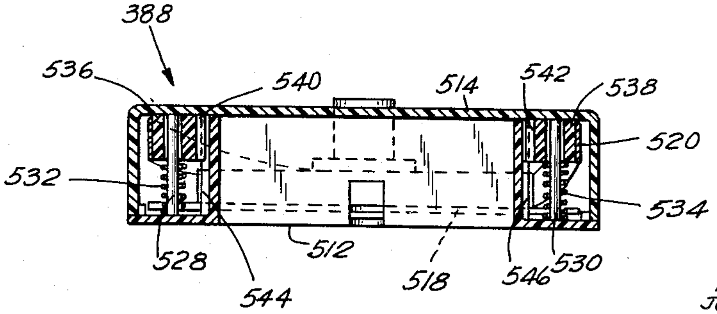
FIG. 38
INVENTORS
ROGER WADE
JOHN C. NEMESNYIK
BY ROBERT BROWN
Kane Dalsimer and Kane
ATTORNEYS INVENTORS
ROGER WADE
JOHN C. NEMESNYIK
BY ROBERT BROWN
Kane, Dalsimer and Kane
ATTORNEYS

United States Patent Office 3,028,790

Patented Apr. 10, 1962

3,028,790

AUDIO-VISUAL APPARATUS

Roger Wade, Port Washington, N.Y., John C. Nemesnyik, Nutley, N.J., and Robert Brown, New York, N.Y., assignors to Charles Beseler Company, East Orange, N.J.

Filed Aug. 31, 1959, Ser. No. 836,952
14 Claims. (Cl. 88—28)

This invention relates to an improved audio-visual apparatus and more particularly to such apparatus possessing minimum weight and reduced dimensions whereby it is rendered readily portable.

To this end, the improved apparatus combines optical, mechanical and electronic systems for its operations. Under such circumstances, an automatic slide film projector is employed and controlled by a signal from a continuous magnetic tape having a recorded voice program and tone synchronized with the slidefilm, which is also continuous.

Thus, this invention provides a sophisticated and novel arrangement and combination of components that supply sequentially projected pictures and an accompanying sound program which emanate from a self-contained unit which may be transported about without any difficulty, thereby rendering it particularly advantageous and convenient for use by salesmen for sales presentations. In this connection, provisions are made for automatically repeating a particular presentation which when completed determines the cessation of operation of the entire unit. In the event the audio part of the program is out of phase with the visual part, synchronization means are employed for automatically relieving this situation. Under normal conditions, the unit requires no rewinding or rethreading of the picture film or programmed sound tape; and both can be expeditiously charged with minimum effort within a relatively short time.

Briefly, the audio-visual apparatus constructed in accordance with the present invention is of relatively light weight and includes a portable reduced-size case having a handle at its top. A section of the front wall of the case is pivotal and is adapted to be swung outwardly to a generally horizontal position. A translucent screen is pivotally connected to this front wall section and is adapted to be positioned within the case when in a folded condition. When the section is shifted to its horizontal position, the screen is adapted to be pivoted to a substantially vertical position at which it is suspended from the section. A releasable latching means, which also provides a light baffling function, assumes the form of a pair of side flaps which are pivotally connected to the screen and are adapted to be disposed within the case when folded together with the screen and its mounting front section. The rear wall of the case presents a door which provides access to the interior of the case. In this connection, a mounting board which supports a major part of the components employed in the present apparatus is mounted adjacent the front wall of the case and within the case interior.

The continuous slidefilm projector is positioned on the mounting board such that it is directed towards one of the side walls of the case. Under such circumstances, a mirror is advantageously located on the mounting board for purposes of directing an image from the projector through an opening in the mounting board on to the screen when in its unfolded vertical position. A replaceable slidefilm cartridge is removably supported by the mounting board and includes a self-winding continuous slidefilm. This slidefilm is suitably guided through the projector and is associated with a film-advancing mechanism which is adapted to advance the film a single frame at a time through the projector. This film-advancing mechanism is activated by a rotary solenoid which is adapted to be energized upon receiving a predetermined electrical pulse.

A tape playback unit is supported by the mounting board and includes a magnetic tape cartridge having a continuous magnetic tape of the self-winding type having a predetermined signal program thereon. This tape is continuously driven and under such circumstances is associated with a pickup head assembly which receives and transmits the signals and program on the tape.

A control means, predominantly in the form of an electrical circuit, operates to energize the solenoid and activate the film advancing mechanism to advance the slidefilm to its next frame in synchronization with the program on the magnetic tape, as a result of predetermined signals located on the tape capable of being received by the pickup head assembly for purposes of properly timed picture frame change.

Other objects, advantages and features of this invention will become apparent shortly from the detailed description which follows, and which should be taken in connection with the accompanying drawings in which:

FIG. 36 is a top plan view of the sound tape cartridge with the cover broken away;

FIG. 37 is a sectional view taken along the line 37—37 of FIG. 36;

FIG. 38 is a sectional view taken along the line 38—38 of FIG. 36;

Figures 1, 2:
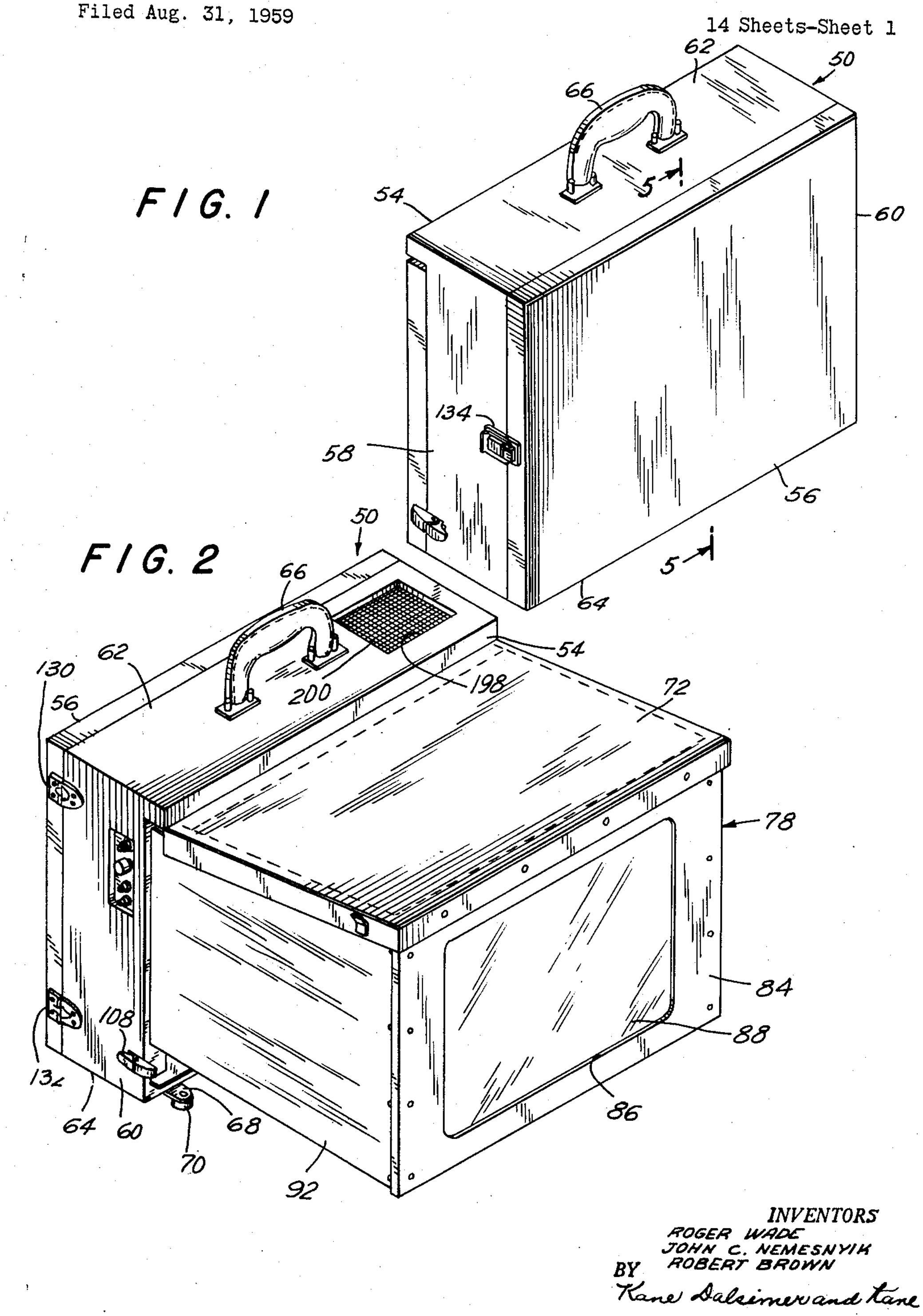
FIG. 1 is a perspective view of a portable audio-visual apparatus incorporating the teachings of the present invention in carrying position looking at the rear door.
FIG. 2 is a perspective view of this apparatus in operative position with the front cover elevated, screen mounted and in viewing position and slide flaps open and properly located to mount the screen.
Figures 3, 4:
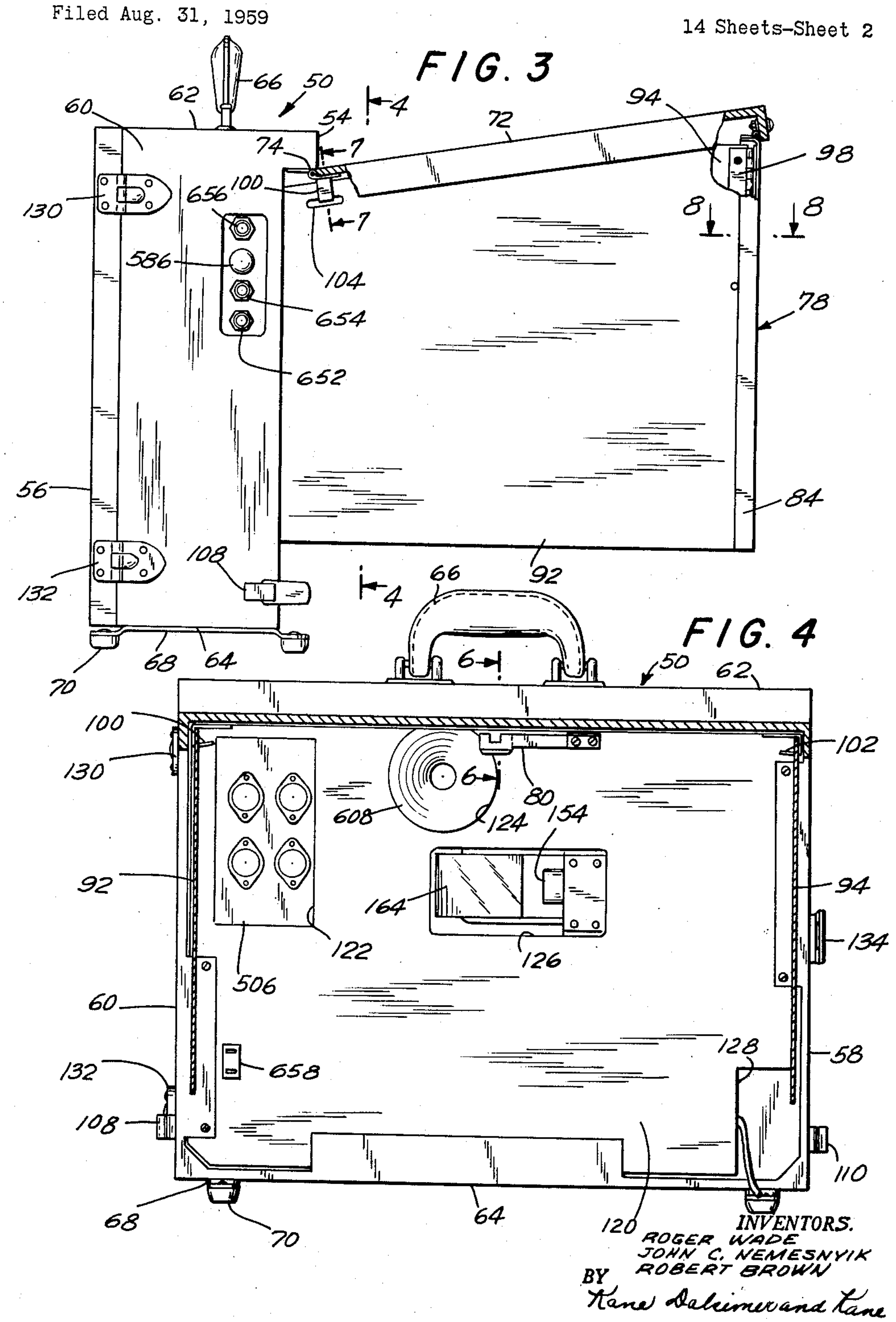
FIG. 3 is a side elevational view of the apparatus illustrated in FIG. 2 with certain parts broken away and removed.
FIG. 4 is a sectional view taken along the line 4—4 of FIG. 3 for purposes of clearly illustrating the front mounting board and associated structure and components.
Figures 5, 6, 7, 8:
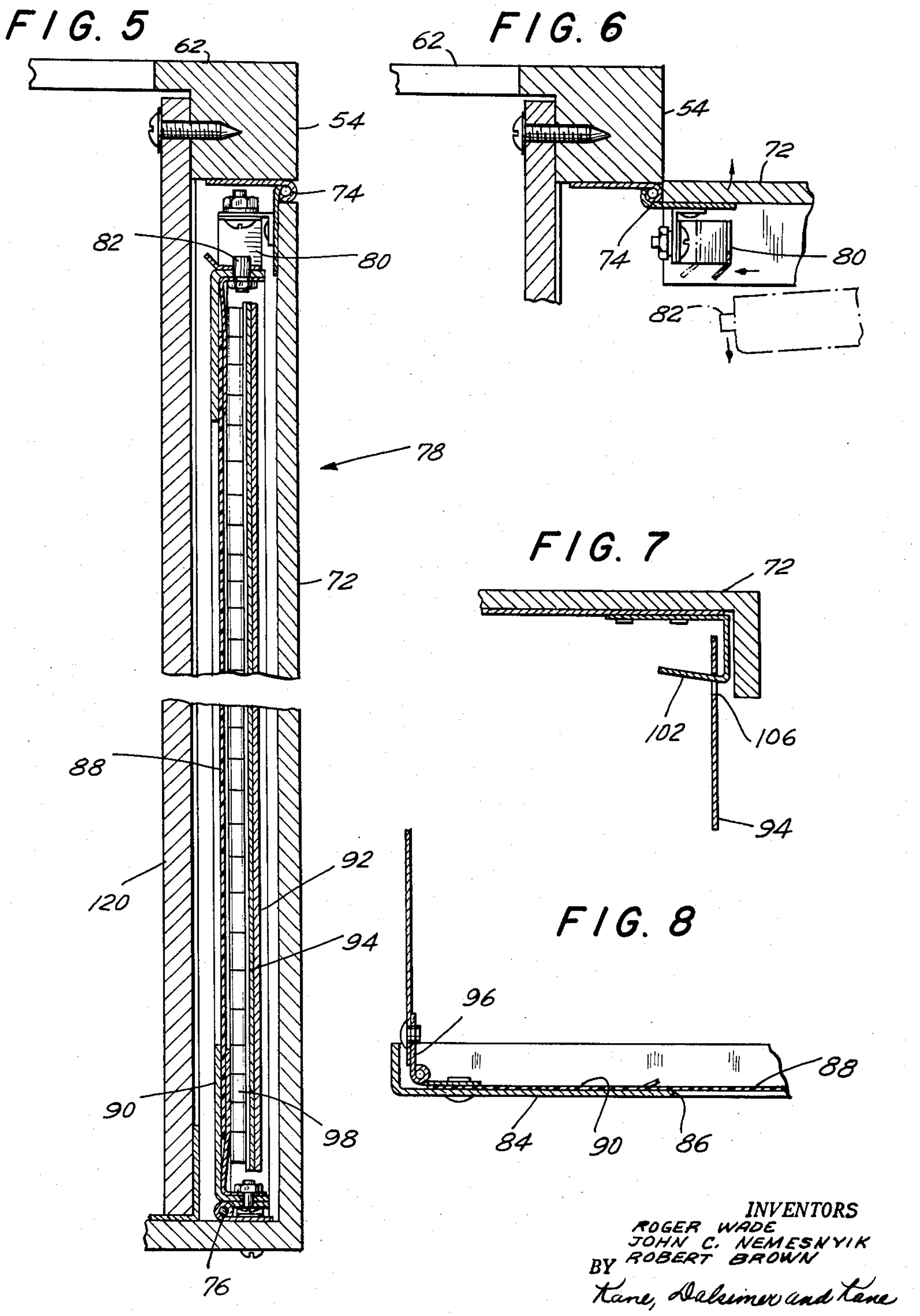
FIG. 5 is a sectional view taken along the line 5—5 of FIG. 1 showing the screen side flaps and front cover in a collapsed and closed position.
FIG. 6 is a fragmentary sectional view taken along the line 6—6 of FIG. 4 showing the front cover in its elevated position with the means for unlatching the screen and associated side flap from the cover.
FIG. 7 is a fragmentary sectional view taken along the line 7—7 of FIG. 3 showing the means for holding the associated side flap in its open and operative position.
FIG. 8 is a fragmentary sectional view taken along the line 8—8 of FIG. 3 showing the screen and associated side flap in their respective operative positions with the interposed hinge arrangement mounting the side flap to the screen.
Figure 9:
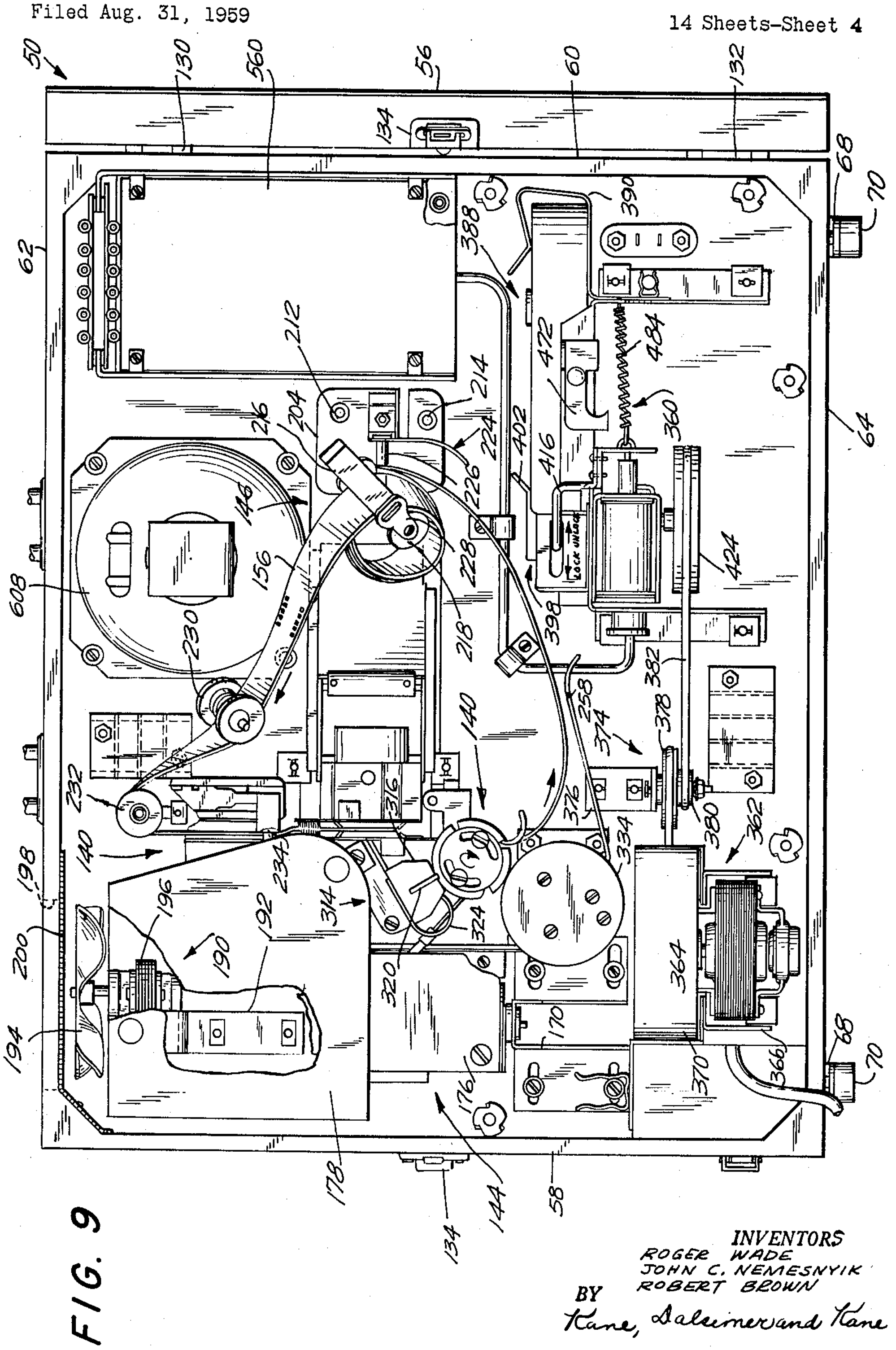
FIG. 9 is a rear elevational view with the rear door open illustrating the mechanism for cooperating to operate the portable audio-visual apparatus of the present invention.
Figure 10:
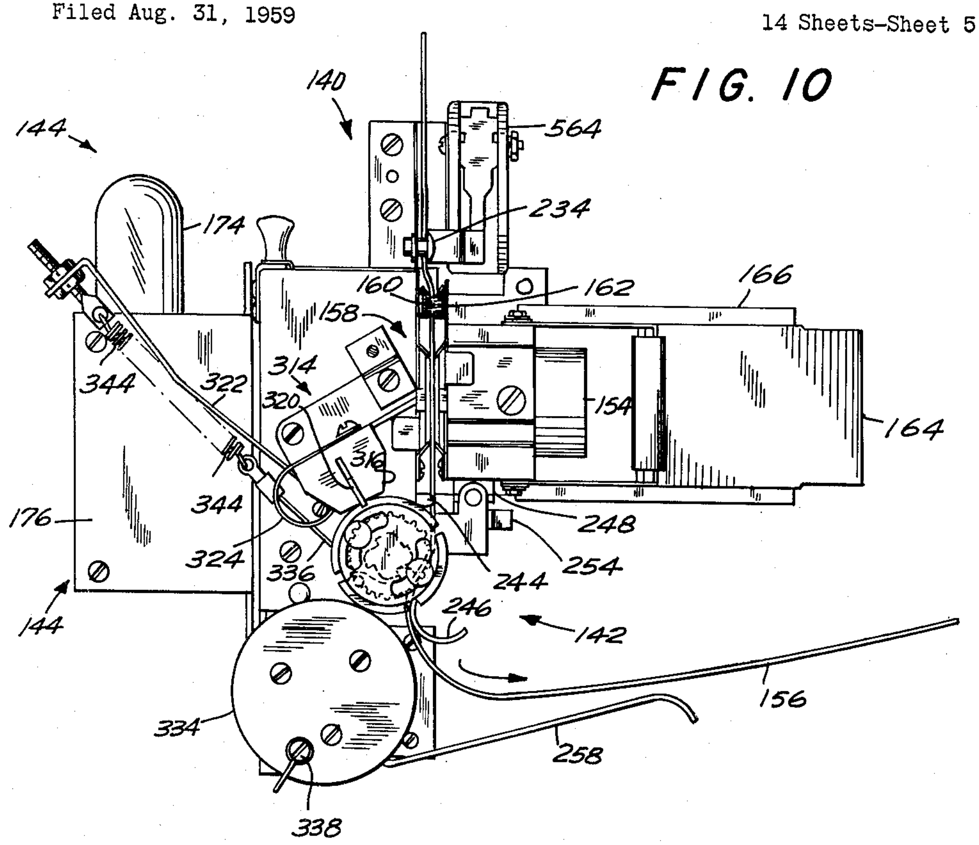
FIG. 10 is an enlarged elevational view of the projector and film advance mechanism showing the path of the film therethrough.
Figure 11:
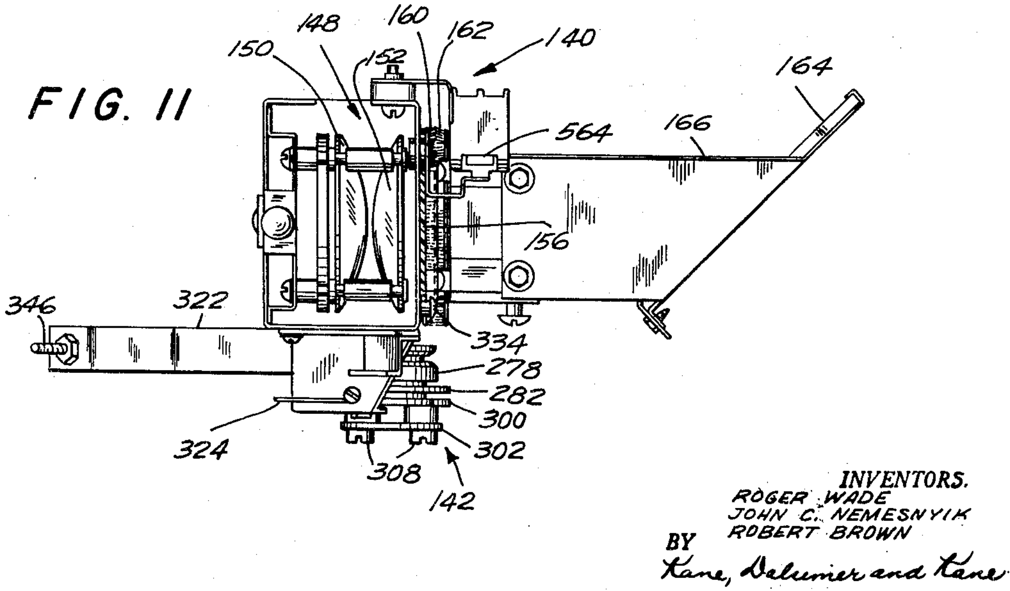
FIG. 11 is a top plan view of the projector and film advance mechanism of FIG. 10.
Figures 12, 13, 14, 15:
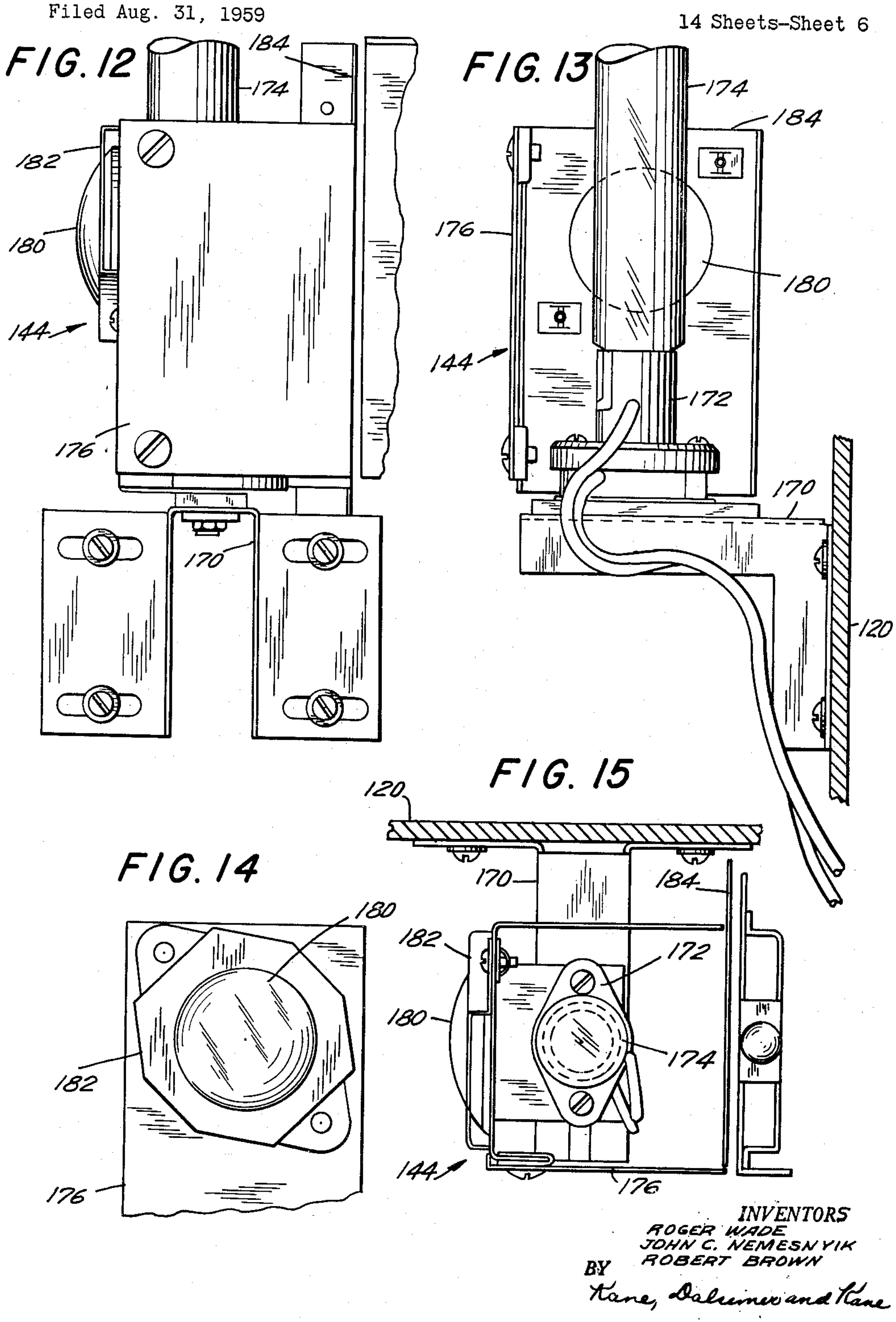
FIG. 12 is an enlarged front elevational fragmentary view of the lamp stand assembly.
FIG. 13 is a side elevational view of this assembly.
FIG. 14 is an enlarged side view of the lamp stand showing the reflector and its mounting brackets.
FIG. 15 is a top plan view of the lamp stand assembly.
Figures 16, 17, 18:
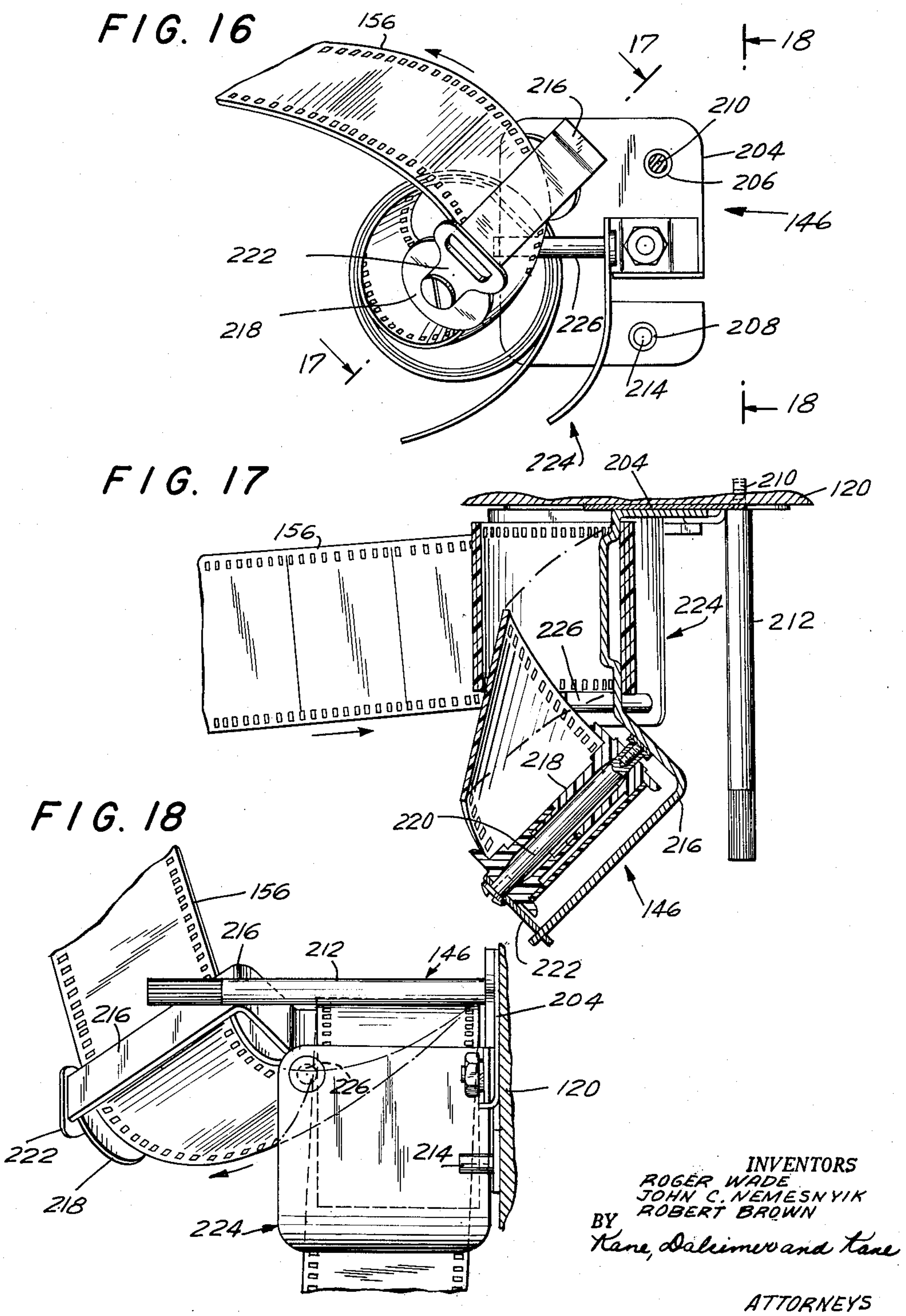
FIG. 16 is a front view of the film cartridge assembly showing fragmentarily a length of film wound about the spool and cartridge.
FIG. 17 is a sectional view taken along the line 17—17 of FIG. 16.
FIG. 18 is a side elevational view taken along the line 18—18 of FIG. 16 showing the locating pin, retaining rod and film on a spool or cartridge.
Figures 19, 20:
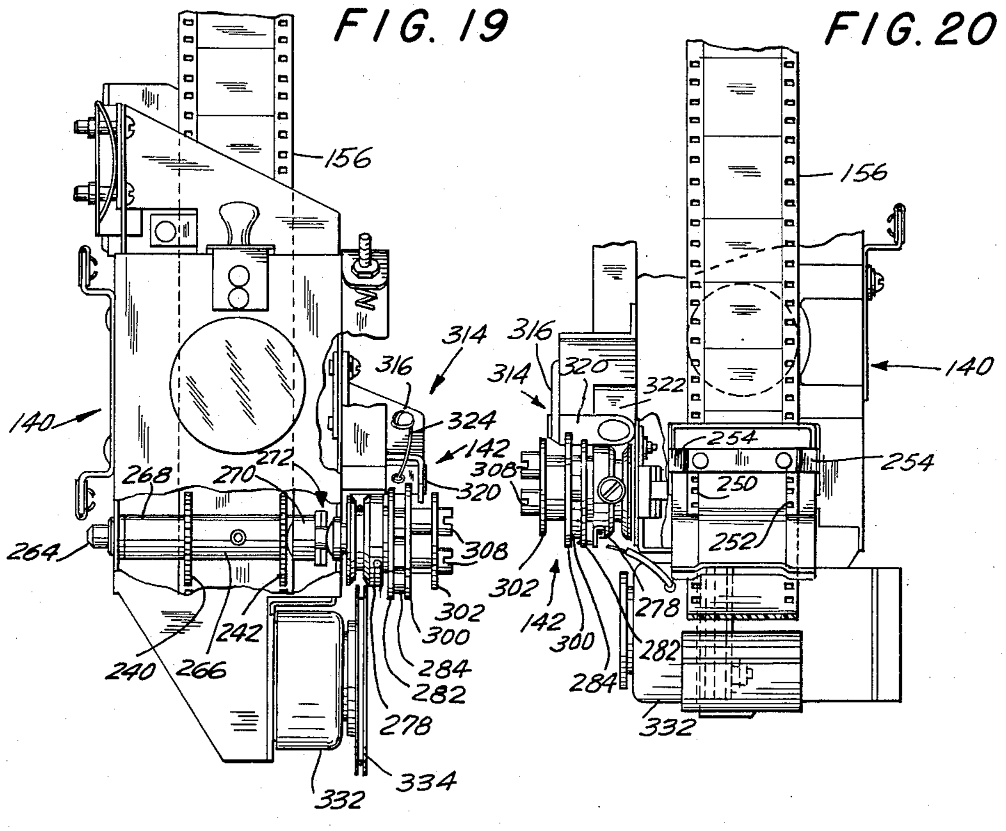
FIG. 19 is a side elevational view of the projector and film advance mechanism with certain parts broken away and removed.
FIG. 20 is a further side elevational view of the projector and film advance mechanism showing the film gate and guide in operative positions.
Figures 21, 22:
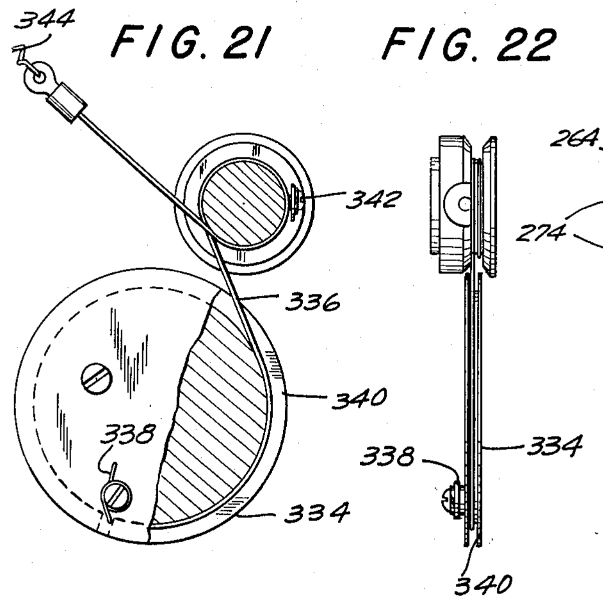
FIG. 21 is a front elevational view of the rotary pulleys and path of cable used for the intermittent movement of the film.
FIG. 22 is a side view of these pulleys and cable.
Figure 23:
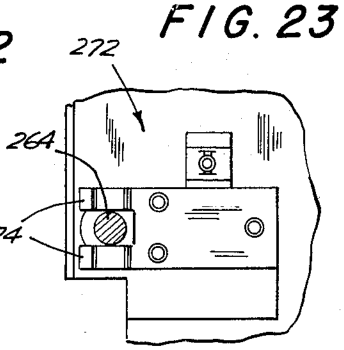
FIG. 23 is a front view of the friction arm assembly.
Figures 24, 25, 26, 27:
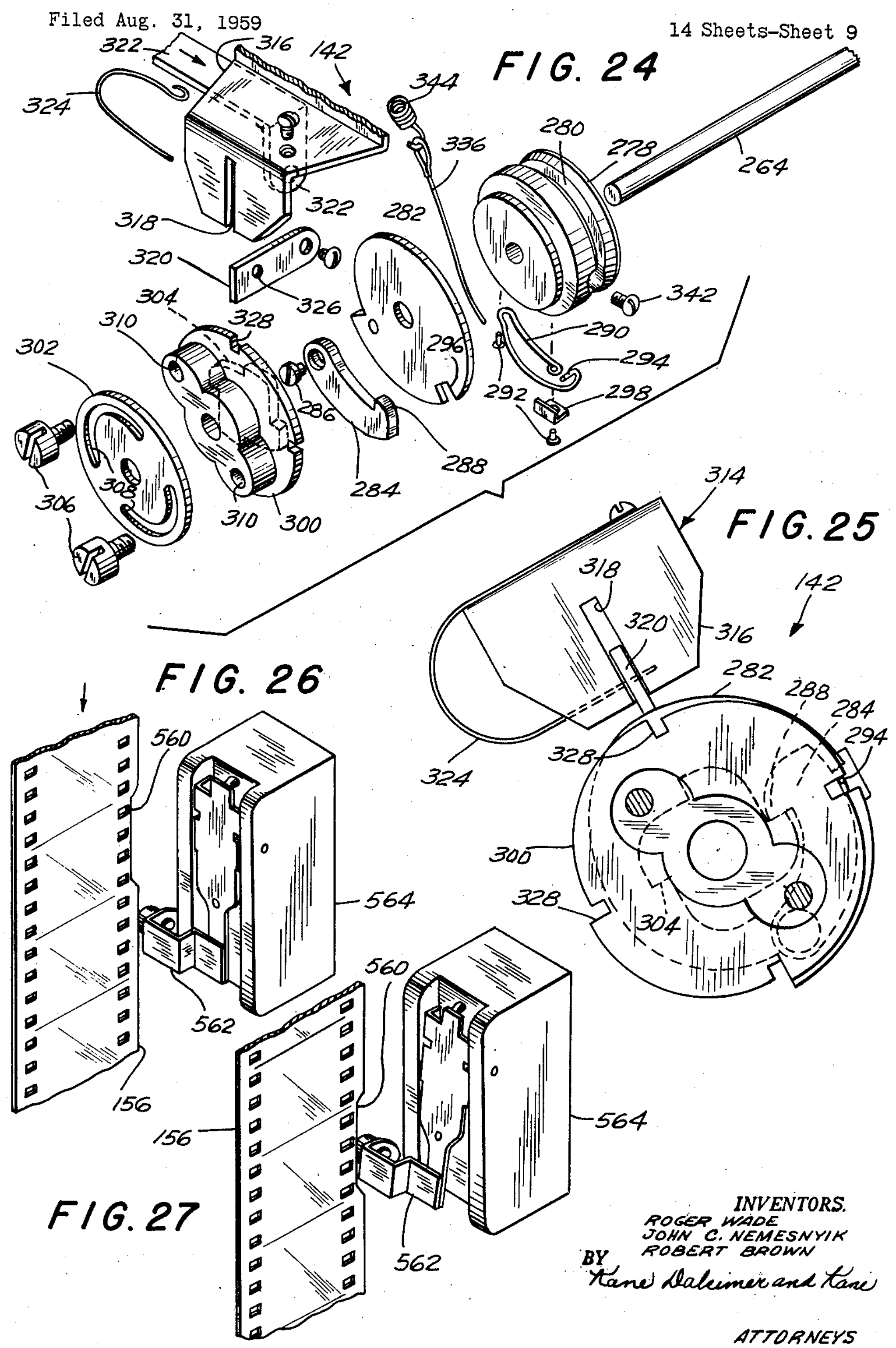
FIG. 24 is an exploded perspective view of the film advance mechanism.
FIG. 25 is an enlarged elevational view of the film advance mechanism in assembled form cooperating with the cam stop assembly.
FIG. 26 is an enlarged perspective view of the micro-switch assembly in an operative position during the film advance.
FIG. 27 is a similar representation of parts with the micro-switch assembly in an operative position resulting from a predetermined signal derived from the film.
Figures 28, 29, 30:
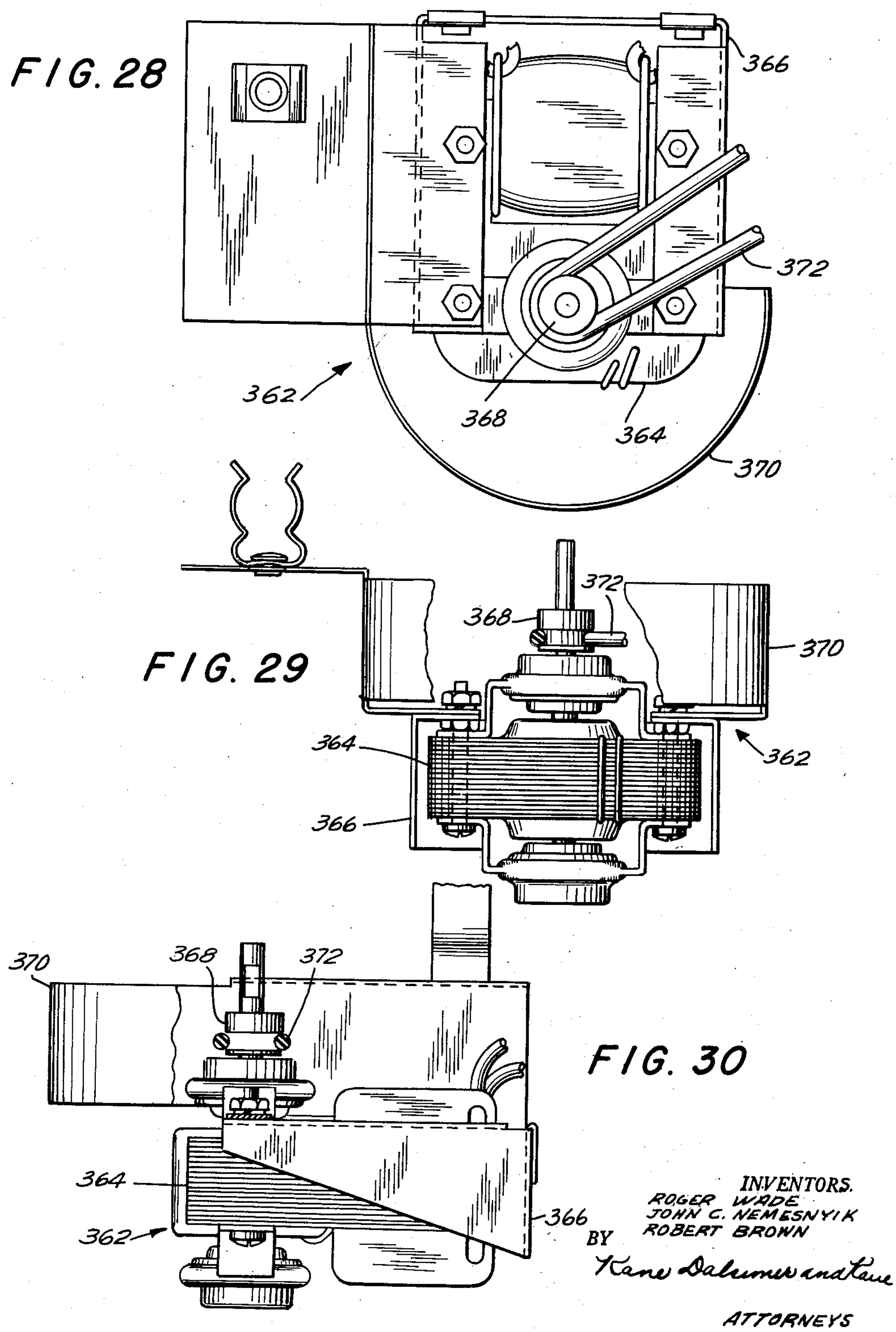
FIG. 28 is a top plan view of the motor drive and pulley assembly for displacing the sound tape.
FIG. 29 is a front view of this assembly with certain parts broken away and removed.
FIG. 30 is a side elevational view of the same assembly.
Figure 31:
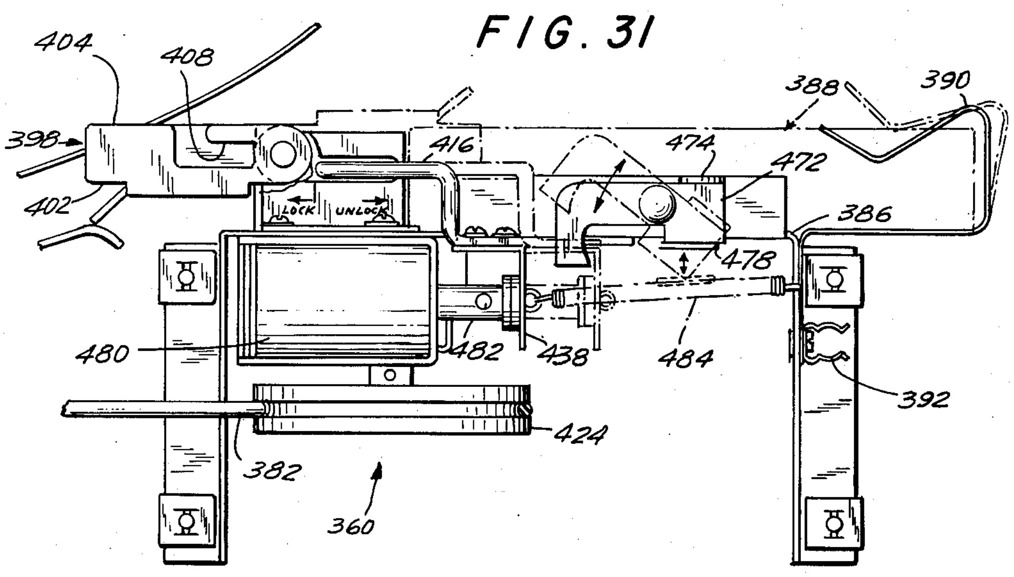
FIG. 31 is a front elevational view of the tape playback unit with the tape cartridge illustrated in phantom showing the various positions of the moving parts.
Figure 32:
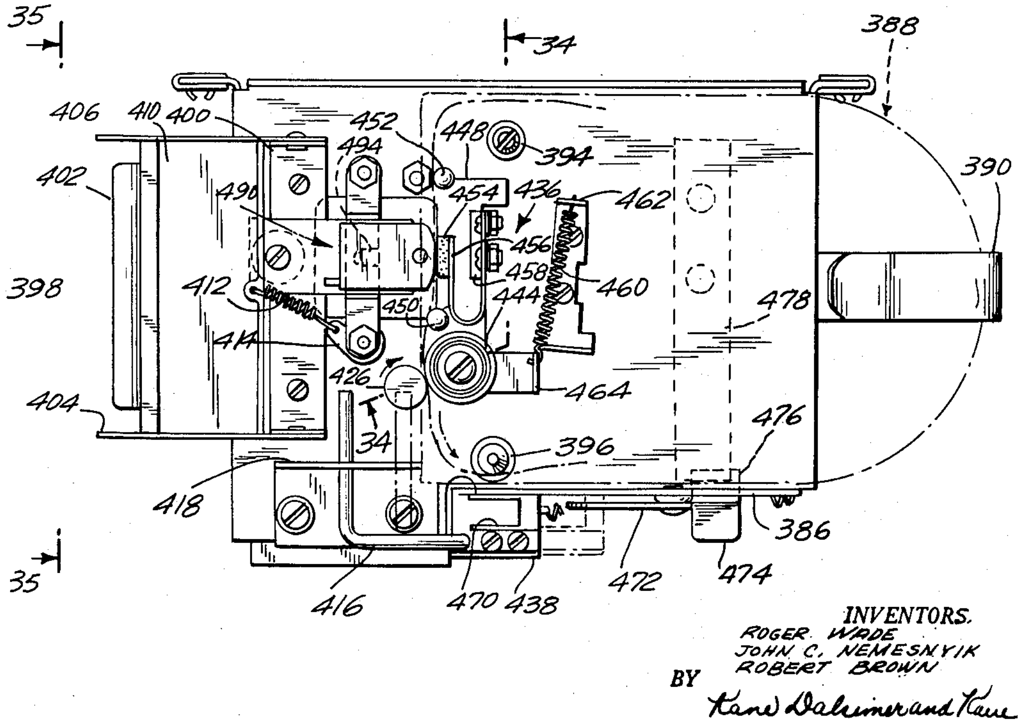
FIG. 32 is a top plan view of this tape playback unit.
Figure 33:
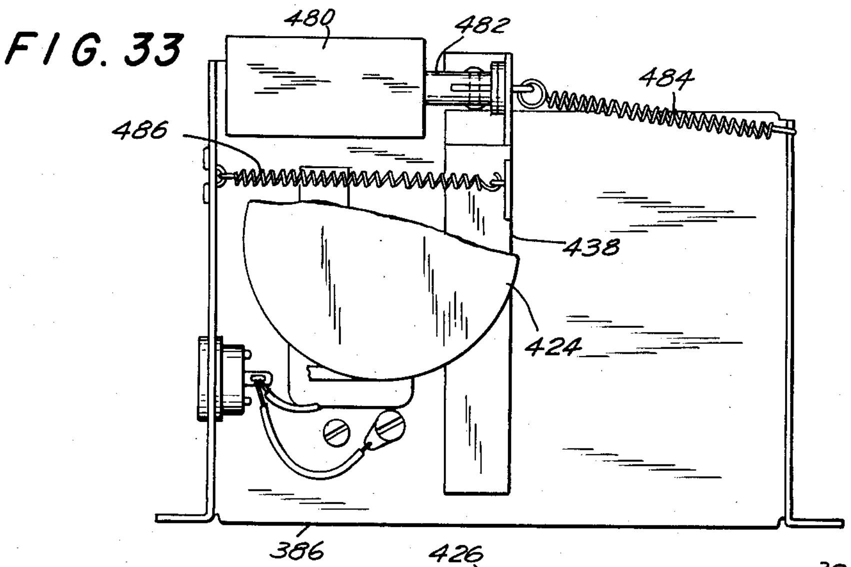
FIG. 33 is a bottom plan view of this tape playback unit with certain parts broken away and removed.
Figure 34:
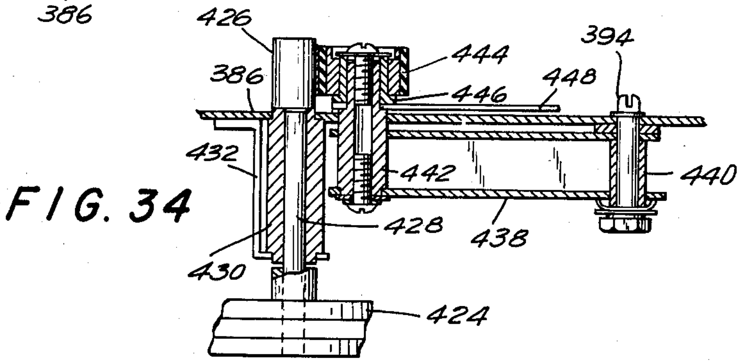
FIG. 34 is a sectional view with certain parts broken away and removed taken along the line 34—34 of FIG. 32.
Figure 35:
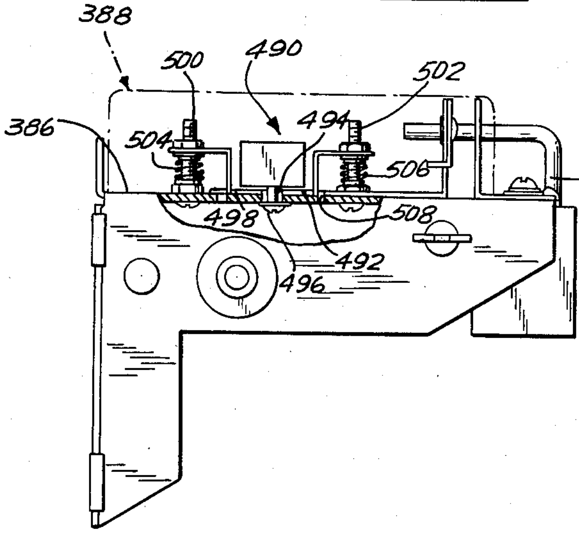
FIG. 35 is a side elevational view of the tape playback unit taken along the line 35—35 of FIG. 32.
Figure 39:
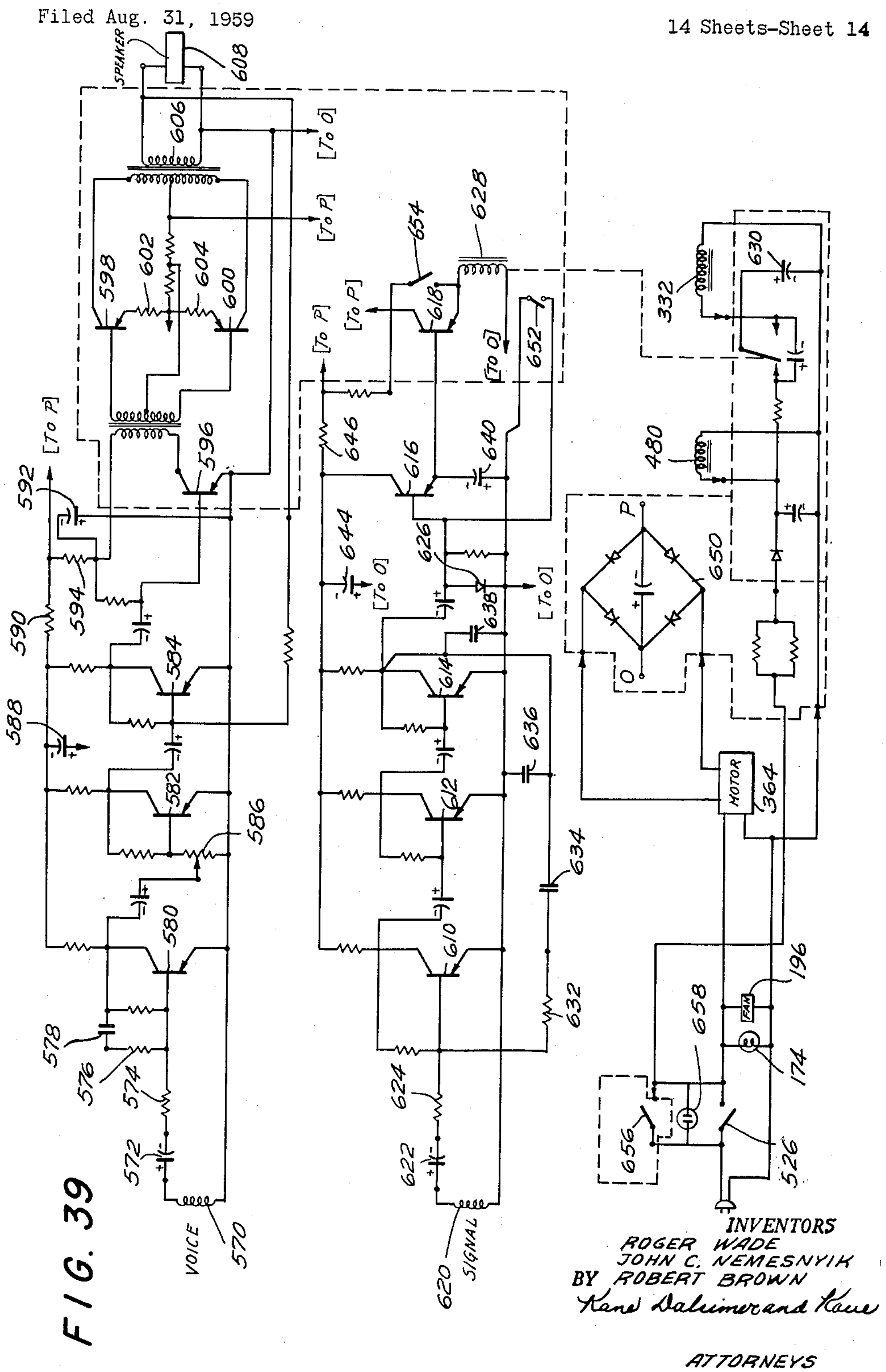
FIG. 39 is a schematic wiring diagram of the electric circuitry incorporated into the present invention.

In the drawings, a case 50 is illustrated having a front 54, rear 56, opposed sides 58 and 60, top 62 and bottom 64. Case 50 may be constructed of plywood, or the like, which may be covered with suitable material such as the usual vinyl sheet material simulating leather. The top 62 has extending therefrom a handle 66 to facilitate carrying case 50, which when fabricated in accordance with the present invention, is no larger dimensionally than the usual attache case. The case 50 is rendered portable by maintaining its weight, together with that of its mounted components, at approximately seventeen pounds. The bottom 64 mounts a pair of braces 68 having resilient feet 70 extending therefrom, which material may be rubber, for purposes of mounting case 50 on a substantially flat surface.

The front 54 is comprised of a screen cover 72 which is pivotally mounted by means of a hinge 74. The screen cover 72 includes another hinge 76 for pivotally mounting a screen assembly 78. The screen cover supports a spring release 80 which is formed with a slot that is adapted to receive a pin 82 projecting from the screen assembly 78 to permit this assembly to be folded in substantially juxta position with respect to the screen cover 72 and releasably lock in this position. The screen assembly 78 comprises a screen frame 84 having an enlarged substantially rectangular opening 86. A screen 88 extends across this opening 86 and is suitably held down and secured by means of hold-down plates 90 which may be located along the sides of screen 88 and anchored to the screen frame 84. The screen 88 is translucent and may be fabricated from a vinyl resin and processed on one side. This type of screen is known to the trade and may be obtained commercially under the name Polacoat. A pair of side flaps 92 and 94 are mounted, respectively, on screen frame 84 by hinges 96 and 98. These side flaps 92 and 94 are adapted to swing from a folded position behind and parallel to the screen assembly 78 to a position normal thereto. In this connection, side flap support hooks 100 and 102 project through slots 104 and 106, respectively, formed in the side flaps. Under such circumstances, the free end of side flaps 92 and 94 bear against surfaces of the case 50 to thereby cooperate in mounting the screen 88 in a substantially vertical position.

The front 54 is releasably locked in its collapsed, folded position by employing a pair of latches 108 and 110 which are operatively associated with both screen cover 72 and their respective sides 60 and 58.

Thus, to unfold the screen 88 and thereby position it for viewing, the latches 108 and 110 are opened. The front 54 is then opened in a direction towards the viewer from the bottom to pivot the screen cover 72 about its hinge 74 until the cover is tilted above the horizontal. The screen assembly 78 is released from the spring release 80 manually to permit this assembly to pivot downwardly about its hinge 76 to a vertical position. The screen assembly 78 is then tilted slightly outwardly and held in this position until the supporting side flaps 92 and 94, which are disposed behind the screen 88 at this time, begin to unfold about their respective hinges 96 and 98. The slots 104 and 106 located in the upper rear corner of the respective side flaps 92 and 94 are then engaged with their respective hooks 100 and 102, which are located under the lip of the screen cover 72. The screen and screen cover are now lowered until they are self-supporting and thusly mount the screen in a substantially vertical position.

A mounting board 120 is secured within case 50 adjacent front 54 in a substantially vertical position. This mounting board 120 serves to mount a major part of the components located within case 50 and is provided with four principal openings 122, 124, 126 and 128. Opening 122 cooperates to mount an electronic chassis; opening 124 is for a speaker; opening 126 is employed for projection purposes and opening 128 provides a suitable passage for an electric cord to be tapped into a suitable electric power source.

The rear 56 cooperates to provide a door mounted on a pair of hinges 130 and 132. This door serves to expose and provide access to the various components mounted within case 50. A latch 134 is operatively connected to the door and side 58 for the purpose of releasably locking or closing the door.

The basic components constituting the visual side of the present invention include a projector assembly 140, a film advance mechanism 142, a lamp stand assembly 144 and a film cartridge assembly 146, all of which are secured to the mounting board 120 and disposed within case 50.

The projector assembly 140 includes the usual condensing system 148 which has a rear condenser 150 and forward condenser 152. In addition, a conventional lens 154 is employed and, as will be appreciated, is directed towards side 60 of case 50. For purposes of the present description, 35 mm. film 156 will be utilized and the projector assembly 140 of the type that will accept this size film for purposes of projecting the desired image. A pressure glass assembly 158 is disposed between the condenser system 148 and lens 154. A pair of cooperating brushes 160 and 162 are mounted on suitable brush holders of the clip type and are disposed above the condenser system 148 to provide their usual function with respect to the advancing film 156.

Forwardly of the lens 154 is a front surfaced mirror 164 supported by a mirror frame 166 which, in turn, is mounted on the mounting board 120 such that the projected image produced by the projector assembly 140 is placed on the back surface of the screen 88 through the opening 126 in the mounting board 120.

The lamp stand assembly 144 is supported by a bracket 170 which is suitably anchored to the mounting board 120 and includes the usual lamp socket 172 which is suitably insulated and spaced from bracket 170 on which it is mounted. A lamp 174 is received by the socket 172 and is surrounded by an inner chimney 176 and an elevated outer chimney 178. A reflector 180 is supported by a bracket 182 which is mounted on the periphery of an opening in the inner chimney 176. A light shield 184 is interposed between the lamp 174 and the projector assembly 140 and is similarly formed with an opening aligned with the reflector opening and the condenser system 148. Thus, when the lamp 174 is on, and in accordance with usual practice, the light is directed through the opening in the shield and suitably collimated through the condenser system 148 through the film 156 and lens 154.

As a result of the generation of heat within the case 50, particularly that from lamp 174, a cooling motor assembly 190 is provided immediately above the lamp. This assembly 190 is mounted by means of a bracket 192 and includes a fan 194 driven by motor 196. The top 62 of case 50 is provided with an opening 198 proximate the fan 194 for purposes of providing egress for the air directed therethrough by the fan 194. The opening 198 is covered by a suitable grill, or the like, 200, which is suitably secured to the top 62.

The film cartridge assembly 146 is of the self-winding type and is removably mounted on the mounting board 120. This assembly 146 includes a base plate 204 which includes a pair of bores 206 and 208. The bore 206 receives a threaded stud 210 of a retaining rod 212 wherein such stud is adapted to extend into a tapped bore in the mounting board 120. The other bore 208 in the base plate 204 is adapted to receive a locating pin 214 which projects from the mounting board 120. A spool brace 216 possessing several bends, the purpose of which will become apparent shortly, extends from and is secured to the base plate 204. A film spool 218 is rotatably mounted on a shaft 220 which is supported between the brace 216 and a spool retaining clip 222. A film guide assembly 224 is additionally mounted on base plate 204 and includes a stud 226 which extends to a point immediately below the lower edge of the spool brace 216. An endless roll of film 156 is wound around the spool brace 216 between the stud 226 and the base plate 204. The film 156 is looped from its inner periphery around the spool 218 in a manner substantially as illustrated.

When properly loaded, the film 156 is looped under spool 230 and over spool 232, both of which are suitably mounted on the mounting board 120 and may assume a construction similar to spool 218. The back edge of the film 156 is pushed under the head of a locating button 234 which is disposed above the brushes 160 and 162. After the film 156 passes through the brushes 160 and 162, and the pressure glass assembly 158, its conventional sprocket openings are adapted to engage the teeth of sprocket wheels 240 and 242 which are spaced from one another a distance corresponding to the distance between the sprocket openings extending along the peripheral side edges of the film 156. A film guide 244 cooperates to maintain this alignment by engaging the side edges of the film 156. A film gate 246 is hingedly mounted by a bracket 248 and includes a pair of slots 250 and 252 which permit proper functioning of the sprocket wheels 240 and 242 when the gate is closed. A leaf spring 254 is mounted on the bracket 248 and has a projecting portion near both of its terminal ends for purposes of keeping the gate closed, but permits the gate to be opened upon the application of a deliberate manual pressure. A film guide 258 is located below the film gate 246 and is suitably mounted on the mounting board 120. As will be evident, the film 156 at this point returns to the film cartridge assembly substantially as shown.

If there are parts of two adjacent picture frames on the screen 88, the film gate 246 should be opened and the film 156 released from the sprocket teeth on sprocket wheels 240 and 242 and pulled down one sprocket hole at a time until the projected picture is squarely on the screen 88. The gate is then closed and the film can be advanced automatically, by mechanism to be described shortly, and the apparatus constituting the present invention will respond automatically when the film 156 is at the beginning.

Reference is now made to the film advance mechanism 142. This mechanism 142 includes a shaft 264 suitably journaled in the projector housing. The sprocket wheels 240 and 242 are fixedly mounted on this shaft 264 through an integral spool 266. A pair of film spool spacers 268 and 270 are mounted on the shaft 264 and thusly cooperate to position the sprocket wheel spool 266. A friction arm assembly 272 is mounted on the projector housing and includes a pair of fingers 274 which embrace the shaft 264 and exert pressure thereon through spacer 270. The shaft 264 projects from the projector housing and rotatably mounts a film advance pulley 278 having an annular groove 280. A stop-lifting cam 282 is mounted on the shaft 264 for rotation with the film advance pulley 278, by employing suitable fastening means between these two parts. A film advance pawl 284 is pivotally mounted on the stop-lifting cam 282, by means of rivet 286, and includes the usual tooth 288 at its other end. A pawl spring 290 is mounted on the peripheral edge of the film advance pulley 278 by a pair of screws 292. The pawl spring 290 includes a projecting free end 294 which extends through a circumferentially located slot 296 in the stop-lifting cam 282 to ultimately engage the outer circumferential edge of the film advance pawl 284 to bias the pawl radially inwardly. A pawl spring retaining angle 298 cooperates to properly position the projecting end 294 of spring 290 so that it will maintain the desired bias against pawl 284.

A framing lock assembly 300 is mounted on the shaft 264 and is rotatable therewith through a framing disc 302. The side of the framing lock assembly 300 immediately adjacent the film advance pawl 284 is provided with a stepped face 304 which is adapted to engage the tooth 288 of pawl 284. The framing disc 302 is suitably riveted to the associated end of the shaft 264. A pair of framing lock screws 306 pass through annular slots 308 in the framing disc 302 into suitably tapped bores 310 in the framing lock assembly 300 such that the disc 302, and consequently the shaft 264, are rotatable with this assembly. Fine film framing is accomplished by rotating disc 302 relative to the framing lock assembly 300 such that a single picture is squarely on the screen 88.

An index stop assembly 314 is mounted on the projector housing and includes a guide bracket 316 having a guide slot 318. A cam index stop 320 is pivotally mounted at one end to an arm 322 which is fused to the guide bracket 316. A cam stop spring 324 is also mounted on the guide bracket 316 and provides a bias on the cam index stop 320 by extending through a bore 326 in this stop. Accordingly, the stop 320, under normal conditions, will be disposed in the slot 318 and under the bias of the spring 324 is adapted to engage with radial slots 328 disposed at the periphery of the framing lock assembly 300. The periphery of the framing lock assembly 300 that bears these radial slots 328 is provided with a cam face between adjoining slots such that a stepped arrangement is also present at the periphery of this assembly.

A rotary solenoid 332 is mounted on the projector housing, and when energized is adapted to drive a rotary pulley 334. A cable 336 is secured to the pulley 334, as at 338, and is disposed in the pulley groove 340 substantially as shown. The cable 336 is then looped in the groove 280 of the film advance pulley 278 and anchored thereto through a head of the screw 342. The outer end of the cable 336 is suitably anchored to an end of a film advance spring 344 which, in turn, has its other end anchored to a bolt 346 mounted by the arm 322 such that the bias of the spring 344 can be adjusted by simply turning the bolt 346.

Thus, in accordance with the present invention, when the solenoid 332 is energized, the pulley 334 will rotate against the bias of the spring 344 and consequently rotate the film advance pulley 278 independent of the shaft 264. A will be appreciated, the peripheral edge of the stop-lifting cam 282 is of increasing radius to thereby lift the cam index stop 320, against the bias of spring 324, out of the slots 328 of the framing lock assembly 300 in which it was engaged. Substantially simultaneously therewith, the tooth 288 of pawl 284 will ride over the stepped face 304 of the framing lock assembly 300 against the bias of its spring 290 to eventually engage the next step of the face 304, with the cooperation of the spring 290. Upon the deenergization of the solenoid 332, the spring 344 will urge the pulley 334 to its return position. When this occurs, the film advance pulley 278 and the stop-lifting cam 282, together with the film advance pawl 284, will rotate back to their starting positions. The tooth 288 of pawl 284 will impart a similar rotary movement to the framing lock assembly 300, which consequently forces the framing disc and shaft 264 through a similar rotary movement. Since the stop-lifting cam 282 returns to its original position, the cam index stop 320, under the influence of its spring 324, will eventually engage the next radial slot 328 in the framing lock assembly 300. In view of the stepped peripheral edge of the framing lock assembly between adjoining radial slots 328, the cam index stop 320 will not override the slot 328 that is next in line. It should be apparent that when shaft 264 is thusly rotated, the sprocket wheels 240 and 242 will rotate to advance the film 156 to its next frame or picture. Obviously, the spacing between the radial slot 328 is such that the film 156 will only be advanced one frame upon each energization of the solenoid 332.

Turning now to the audio side of the apparatus of the present invention, the tape playback unit 360 is anchored to the mounting board 120, and is driven by a motor and pulley assembly 362 similarly mounted on the board 120. This assembly 362 includes a tape-drive motor 364 mounted on the mounting board 120 by means of the bracket 366. The drive shaft of the motor 364 has securely mounted thereon a pulley 368 which is surrounded by a shield 370, also supported by the bracket 366. A belt 372 transfers the rotational movement imparted to the pulley 368 to an idler pulley assembly 374 which is rotatably mounted by means of bracket 376 on the board 120. The pulley assembly 374 includes pulley 378 which engages the belt 372 and another pulley 380 which drives a belt 382 leading directly to the tape playback unit 360.

The tape playback unit 360 comprises a chassis 386 secured to the mounting board 120 and adapted to receive a sound tape cartridge 388 to be described shortly. A cartridge hold-down spring 390 is mounted on one end of the chassis 386 for purposes of anchoring a mounted cartridge 388 and may present a number of clips 392 for storing electrical fuses. Additionally, the chassis includes a pair of locating pins 394 and 396 which cooperate with surfaces of the tape cartridge 388 to insure proper cartridge arrangement. A tape hold-down yoke assembly 398 is positioned on the chassis 386 distal the spring 390 for purposes that will become apparent shortly. The yoke assembly 398 includes a bracket mounting 400 secured to the chassis 386. This mounting 400 pivotally supports a yoke 402 having a pair of side flanges 404 and 406, with flange 404 formed with a slot 408. A shield 410, for a pick-up head to be described, is mounted on the yoke 402. A tape hold-down spring 412 is anchored to the yoke 402 and a lug 414 which is secured to the chassis 386 by structure to be described in connection with the pick-up head assembly. A rod 416, which is shiftable within a slot in a guide 418, is adapted to be disposed in slot 408 of yoke 402 such that the yoke 402 can be releasably locked in a tape hold-down position.

As mentioned in the foregoing, the pulley belt 382 cooperates to drive the tape playback unit 360. To this end, a flywheel 424 is engaged by this belt and transmits the imparted rotary motion to a capstan 426 through a drive shaft 428. This drive shaft 428 is suitably supported by means of the bearing 430 which is secured to the underside of the chassis 386 by means of the bracket 432.

A shiftable pressure guide arm assembly 436 is mounted by the chassis 386 to cooperate with the capstan 426 in driving the tape and to place this tape against a pick-up head to be described shortly while at the same time being conveniently located free from interference from the tape cartridge in performing its desired function. Thus, beneath the chassis 386 an idler support arm 438 is pivotally mounted on a stud 440, the upper end of which forms one of the cartridge locating pins 394. An idler post 442 is mounted on the arm 438 and rotatably supports an idler 444 through an interposed bearing 446, both of which are located above the upper face of chassis 386 and adapted to be shifted towards and away from the capstan 426. In order to facilitate the shifting of the idler 444, the chassis 386 is provided with a suitably dimensioned opening. The pressure guide arm assembly 436 further includes a plate 448 fixedly secured to the post 442, and consequently is shiftable therewith. This plate 448 has extending from the upper face thereof a pair of spaced tape positioning pins 450 and 452. A pressure pad 454 is interposed between these positioning pins for purposes of placing the tape against the mentioned pick-up head. The pressure pad 454 is mounted on a bent strip 456, possessing a certain degree of resiliency, which strip, in turn, is anchored to the plate 448 by means of a bracket 458. A bracket positioning spring 460 is biased between a bracket 462 which is secured to the chassis 386 and a flange 464 which forms an integral extension of the plate 448. Under such circumstances, the spring 460 forces the idler 444 to retract slightly when the tape is not being driven so that indentations are not formed in the outer face of the idler 444, as a result of its bearing against the capstan during non-use of the audio part of the apparatus. The bracket 462 is adapted to engage the flange 464 for purposes of maintaining the proper relationship between the plate 448 and the idler post 442 upon the shifting of arm 436.

The arm 438 is provided with an integral extension which supports the rod 416 and has formed therein a slot 470 spaced inwardly from this support. This slot 470 is adapted to engage a latch 472 which is manually shiftable in maintaining the rod 416 with respect to the slot 408 at a position at which it either locks or unlocks the yoke 402, which as will be recalled functions as a tape gate. The latch 472 includes an outwardly extending finger-gripping flange 474 for effecting this latch movement, and more particularly to pivot the latch in an upward direction about its pivot point. In addition, the latch includes an inwardly extending flange 476 which engages a leaf spring 478 attached to the undersurface of the chassis 386 for creating a bias on the latch 472 to thus force it in a downward direction about its pivot point.

An in-line solenoid 480 is suitably mounted on the chassis 386 and has an extension 482 of its core coupled with the arm 438. A pair of counter-balance springs 484 and 486 are anchored to the chassis 386 and the arm 438, with one end of spring 484 being positioned proximate to the terminal end of the extension 482 of the core of solenoid 480. These springs 484 and 486 cooperate with spring 460 to maintain the idler 444 in a neutral position at which it is slightly spaced from the capstan 426.

A stereo head assembly 490 is suitably mounted on and insulated from the chassis 386. To this end, the pick-up head assembly 490 is adjustable in three directions to secure its proper location. Accordingly, a bracket 492 is provided with a slot 494 which receives a screw 496 for attaching the pick-up head assembly 490 thereto with a suitable insulating material 498 properly interposed therebetween. The provision of the slot 494 in the bracket 492 facilitates movement of the pick-up head assembly 490 in a longitudinal direction. The terminal ends of the bracket 492 are positioned on a pair of bolts 500 and 502 which are secured to the chassis 386. A pair of springs 504 and 506 supply a bias against the bracket ends on the respective bolts 500 and 502. It should be clear that the bracket 492, and consequently the pick-up head assembly 490, can be lowered through opening 508 in the chassis 386 or elevated, as the case may be, by simply adjusting the nuts threaded on the bolts and bearing against the bracket ends.

The pick-up head assembly 490 is adapted to receive signals placed on the magnetic tape of the tape cartridge 388. In this connection, the tape will include the voice program for the film 156, and in addition a recorded signal for actuating the film advance mechanism 142 to advance the next picture or frame on the film 156 upon the expiration of that phase of the recorded voice program for the frame being projected. Accordingly, the pick-up head assembly 490 may be constructed of two separate playback heads or a single, dual channel head, both of which are known to those skilled in the magnetic tape pick-up head art.

Reference is now made to the magnetic tape cartridge 388. This cartridge comprises a base 512 and cover 514 which are adapted to be attached to one another by means of a screw 516, or the like. The base 512 rotatably mounts a disc 518 on which is mounted an endless roll of magnetic tape 520 which, in accordance with the present invention, is of the self-winding type. The base is so constructed that, together with the cover, an enlarged recess 522 is provided for conveniently receiving the pressure guide arm assembly 436. The base 512 is also provided with a pair of openings 524 and 526 for receiving the cartridge locating pins 394 and 396, respectively. A pair of pins 528 and 530 extend upwardly from the base 512 and are respectively surrounded by springs 532 and 534. A pair of sleeves 536 and 538 are slidably mounted on the pins 528 and 530, respectively. These sleeves 536 and 538 have projecting lugs 540 and 542, respectively, disposed in slots 544 and 546 in base 512. Arms 548 and 550 extend from the respective sleeves 536 and 538 for purposes of normally mounting a loop of the tape 520 in a protective passageway 552 formed by walls of the base 512 and cover 514 adjacent the top of the cartridge 388. The cover 514 is formed with a pair of slots 554 and 556 which are adapted to receive, respectively, the flanges 406 and 404 of the yoke 402, when the cartridge 388 is properly mounted on the chassis 386. Under such circumstances, the sleeves 536 and 538, and consequently the loop of the tape 520, will be lowered to expose the tape for purposes of ultimately placing it against the pick-up head assembly 490.

In loading the tape magazine cartridge 388, the latch 472 is held open by pressing downwardly on the finger-gripping flange or tab 474. The yoke or gate lock rod 416 is moved to its unlock position by applying force to the arm 438 directed away from the solenoid 480. The tape yoke or gate 402 is then opened and the tape cartridge 388 inserted under the spring 390 with the end of the cartridge bearing passageway 552 directed away from this spring 390. The cartridge 388 is settled in a horizontal position on the chassis 386 such that the locating pins 394 and 396 are disposed in the openings 524 and 526, respectively, formed in the cartridge base 512. The tape gate 402 is then gently closed to depress the sleeves 536 and 538, and consequently the loop of the magnetic tape 520. The rod 416 is now moved to its lock position and, substantially simultaneously therewith, the latch 472 released. At such time the loop of the tape 520 will be positioned by the pins 450 and 452 adjacent the pick-up head assembly 490 and will be interposed between the capstan 426 and idler 444, both of which are slightly spaced from one another such that they are unable to drive the tape until it is desired to set the apparatus in operation.

When the magnetic tape 420 is at its start position, a starting index or mark is placed at a conspicuous place along the tape such that it may be readily viewed or observed. In this connection, all or certain of the walls of the cartridge 388 may be fabricated from a substantially transparent material such as the conventionally employed resins for such purposes.

As mentioned in the foregoing, the film advance mechanism 142 is adapted to advance the film 156 one picture frame at a time. This picture frame advancement is actuated when a predetermined signal placed on the magnetic tape 520 is picked up by the pick-up head assembly 490, passed through electronic circuitry to be described shortly, to ultimately energize the rotary solenoid 332 to thereby set the film advance mechanism 142 into operation. Provision is made for automatically stopping the apparatus when the last picture frame of film 156 has been projected and the film is at the beginning. In this connection, the film 156 is provided with a notch 560 which is adapted to be utimately engaged by the arm 562 which is spring-biased outwardly of a micro-switch 564. The micro-switch 564 is mounted on the mounting board 120 and is designed in such a way that, in conjunction with the notched film 156, it will turn the apparatus off when the program comes to an end. Conversely, when the film is advanced by the first film advance pulse that energizes the rotary solenoid 332, the micro-switch lever arm 562 is depressed by the full width of the film; power is consequently maintained on by the micro-switch 564 and the apparatus will then operate automatically in accordance with the selected predetermined audio-visual program.

Reference is now made to the circuitry employed in automatically operating the audio and visual parts of the present invention in synchronization. It will be evident that the playback head 570 constitutes part of the pick-up head assembly 490 and responds to the sound program placed on the tape 520. The incoming signal from the head 570 is peaked by the capacitor 572 and resistor 574, which also provide for proper low frequency roll-off. The circuit composed of resistor 576 and capacitor 578 is designed to provide a treble frequency boost at about 6,000 cycles per second. The remainder of the circuitry of the voice channel is a general audio amplifier. Under such circumstances, the circuits of transistors 580, 582, and 584 are so biased that they are not seriously affected by large changes of power-supply voltage. A volume control resistance 586 is interposed between transistors 580 and 582 and is of a value capable of minimizing frequency response changes with setting. The circuit comprising capacitor 588 and resistor 590 forms a de-coupling network, preventing harmonic interaction between the transistors 580 and 584. Similarly, capacitor 592 and resistor 594 form a de-coupling network isolating a transistor 596 from interaction with the pre-amplifier.

The transistor 596 is a power transistor and acts as the driver. Under such circumstances, this power transistor is selected for purposes of allowing the proper current swing, since the final stage which includes transistors 598 and 600 requires a relatively large driving signal. The output stage is operated by a push-pull, Class B amplification. The resistors 602 and 604 form a temperature stabilizing circuit allowing the amplifier to work up to 200 degrees Fahrenheit without appreciable loss in operating characteristics. As will be understood, a feedback loop is taken directly from the secondary of the output transformer 606 and provides considerable stability and lack of harmonic distortion. The output of this transformer is applied to a speaker system 608 which is mounted on the board 120.

The signal channel, on the other hand, is composed of an audio amplifier which includes transistors 610, 612 and 614, and associated circuits; a D.C. amplifier having transistor 616 and associated circuits; and a transistor switch 618. A signal is introduced to the circuitry from the pick-up head 620 which also forms part of the pick-up head assembly 490. This signal is peaked by capacitor 622 and resistor 624 which provide for proper low frequency roll-off. This signal is amplified by the audio amplifier, rectified by diode 626, and then amplified by the D.C. amplifier. The amplified D.C., accordingly, will trigger the transistor switch 618, which, in turn, activates the relay 628. This relay 628 permits the condenser 630 to discharge through the film advance rotary solenoid 332 which, in turn, activates the film advance mechanism 142.

A feedback loop, including resistor 632, capacitor 634 and capacitor 636, provides temperature stability and bias control. A capacitor 638 is employed to prevent oscillation in the third audio stage. In addition, a capacitor 640, in conjunction with the resistances of transistors 616 and 618, provides a slight time delay so that the relay 628 tends to hold up, thus preventing undue relay chatter. Capacitor 644 and resistor 646 form a de-coupling network substantially the same as that described in the above. In this connection, the de-coupling networks of both voice and signal channels serve to prevent interaction of the film advance signal with the voice program.

D.C. power for the amplifier is supplied by an isolated step-down winding in the drive motor 364. This winding provides A.C. power, which is rectified and filtered by the full-wave-rectifying diode bridge 650. The rotary solenoid 332 has one lead connected to the common side of a rectified power line. The other lead is connected to one side of the relay contacts forming part of relay 628. In its normal position the relay 628 permits the capacitor 630 to charge up across the rectified line. When this relay 628 is activated, it places the charged up condenser across the rotary solenoid 332 allowing it to discharge through this solenoid in the form of a D.C. pulse. Under such circumstances, the solenoid will be actuated, and accordingly will operate the film advance mechanism 142.

A hold switch 652, which is normally open, is employed to prevent the relay 628 from being actuated by any signals transmitted by the pick-up head 620. Thus, the film advance mechanism 142, by means of the rotary solenoid 332, will not be permitted to advance the film 156 when this switch 652 is closed, when the tape 520 is being driven and the predetermined signals placed on this tape 520 traverse the pick-up head 620. Another switch 654, which is normally open, is employed for purposes of activating the relay 628 when closed to thusly energize the rotary solenoid 332. Under such circumstances, the film 156 will be advanced independently of any signals received by the pick-up head 620. A start switch 656 is similarly normally open and when closed, will actuate the lamp 174, fan motor 196 and drive motor 364 to eventually cause the first frame advancement when the film 156 is at the beginning. At such time the micro-switch 564 will be depressed and closed after its arm 562 becomes disengaged with notch 560 in film 156 to maintain the power circuitry closed independent of the start switch 656. Simultaneously therewith the in-line solenoid 480 is energized and displaces its core inwardly to force the idler 444 against the capstan 426 with the loop of the tape 520 interposed therebetween to cause the tape to be driven. At such time the loop of tape 520 is pressed against the pick-up head assembly 490 by the pressure pad 454 such that the pick-up head assembly 490 will receive the signals on the tape. An outlet 658 may be employed for purposes of remote control in lieu of the switch 656.

The start switch 656, the volume control 586, the film advance switch 654 and the film hold switch 652 are conveniently located and exposed on the side 60 of the case 50 as shown. Furthermore, the amplifier assembly and associated components are located on the chassis 660, which traverses the opening 122 in the mounting board 120 and is suitably secured to the latter.

When the film cartridge 146 has been properly loaded prior to the insertion of the tape magazine cartridge 388, the apparatus may be plugged into a suitable electric outlet. The light 174 should then come on, but if not, the switches 656 and 654 should be simultaneously closed until this light remains on. Assuming that the screen 88 has been unfolded and properly mounted in a vertical position, a picture should now fill the screen 88. Naturally, in the event that there are parts of adjacent picture frames on the screen, the film should be manually advanced one sprocket opening at a time until the picture is squarely on the screen 88. The film 156 may then be advanced by repeatedly closing the switch 654 until the light 174 goes out. At this point the fan motor 196 will stop and the switch 654 will no longer advance the film 156. As stated in the foregoing, this occurs when the micro-switch arm 562 is disposed in the notch 560 in film 156. Under such circumstances, the film 156 is at the beginning.

The tape cartridge 388 may now be properly loaded such that the sound is at the beginning of its program and synchronized with the film 156. The switch 656 is then closed and held in such position until the first picture change. The volume control 586 is suitably adjusted and, as will be apparent, the pictures and sound will continue until the end of the programmed show. The apparatus will then shut off automatically.

To stop the show before it has reached the end, the rear 56 of case 50 should be opened and the latch 472 held open. The tape gate rod 416 should be moved to its unlock position at this time and the latch 472 released. Obviously, to resume operation, the latch 472 should be opened and the rod 416 moved to its locked position.

If the film 156 and the tape 520 are out of synchronization, the switches 654, 652 may be manipulated while the tape 520 is being continuously driven. Thus, the film advance switch 654 may be repeatedly closed to advance the pictures until they catch up with the sound. On the other hand, the film hold switch 652 may be depressed to prevent the pictures from changing until the sound has caught up.

Although a single preferred embodiment of the present invention has been illustrated and described, it should be understood that the invention is in no sense limited thereby and its scope is to be determined by the appended claims.

We claim:

1. Audio visual apparatus of relatively light weight comprising in combination: a portable reduced-size case having a handle and including top, bottom, front, rear and side walls, a section of the front wall being pivotally connected to the case and adapted to be swung outwardly about said pivotal connection to a generally horizontal position, a translucent screen secured to said section and positioned within the case, said screen being adapted, upon disposition of said section in said horizontal position, to be supported in a substantially vertical position from the end of said section directed away from said pivotal connection, releasable means for holding said section in said horizontal position and said screen in said vertical position, a mounting board having an opening and being positioned within said case adjacent said front wall, and said rear wall being selectively shiftable for providing access to the interior of said case; a continuous loop film strip projector disposed within the case on said mounting board and directed toward one of said side walls, a film strip cartridge including a continuous film strip and being removably mounted on said mounting board, guide means for operatively connecting said continuous film strip to said projector, a mirror mounted within said case on said mounting board between said projector and one of said side walls to direct an image from said projector to said translucent screen, film advancing means operatively connected to said projector for advancing said film strip a single frame at a time therethrough, electrical means for activating said film advancing means, said film advancing means comprising a sprocket hole engaging means for engaging the sprocket receiving openings in said film strip, means coupling said electrical means and said sprocket hole engaging means for actuating said sprocket hole engaging means to advance said film strip to its next frame upon energization of said electrical means; a tape playback unit including a record tape cartridge having a continuous record tape having a predetermined signal program thereon, chassis means coupled with said mounting board removably supporting said cartridge within said case; means for continuously driving said tape, signal pickup means mounted for operative connection with said tape for receiving and transmitting signals on said tape, and first control means providing electrical connection with said electrical means for energizing said electrical means upon transmission of said signals on said tape by said signal pick-up means to activate said film-advancing means to advance said film strip to its next frame in synchronization with the program on said tape, said mounting board is provided with another opening and a speaker mounted on said mounting board across said opening, second control means for transmitting electrical audio signals from said pick-up means to said speaker, both of said control means including electrical circuitry, an electrical chassis mounted on said mounting board within said case, and said circuitry being coupled to said chassis and being disposed within said case.

2. The invention in accordance with claim 1, wherein said releasable means includes a pair of side flaps hingedly connected adjacent opposed side edges of said screen, said flaps being positioned within said case and being adapted upon disposition of said section in said horizontal position and said screen in said vertical position to be pivoted to a position substantially normal to said screen and said section and being adapted to be releasably coupled to said section, and said flaps functioning to shield light when pivoted to the position substantially normal to said screen and said section.

3. The invention in accordance with claim 1, wherein said top of said case is provided with a second opening located substantially above said projector, and a fan means mounted on said mounting board substantially above said projector and adjacent said second opening for directing air from within said case outwardly through said second opening.

4. The invention in accordance with claim 1, wherein said film strip cartridge includes means for self winding of said film strip during the advance of said film strip through said projector.

5. The invention in accordance with claim 1, wherein said record tape cartridge includes means for the self winding of said record tape as it is driven by the driving means.

6. The invention in accordance with claim 1, wherein said film-advancing means comprises a shaft, said sprocket hole engaging means includes a sprocket wheel mounted on said shaft for engaging the sprocket receiving openings in said film strip, a pawl means rotatably mounted on said shaft and being operatively connected to said electrical means, a pawl-engaging means secured to said shaft for imparting rotation to said shaft and said sprocket wheel to advance said film strip upon rotation of said pawl means.

7. The invention in accordance with claim 6, wherein said pawl-engaging means includes spaced slots, a retractable lock for engaging said slots to lock said pawl-engaging means, said pawl means includes a cam for retracting said lock upon rotation of said pawl means to permit said pawl-engaging means to rotate with said pawl means a distance determined by the space between adjacent slots so that said film strip will be advanced a single frame at a time.

8. The invention in accordance with claim 1, wherein said first control means includes means for energizing said electrical means to activate said film-advancing means independent of the program on said tape.

9. The invention in accordance with claim 1, wherein said first control means includes means for rendering said electrical means and said film-advancing means inoperative, irrespective of the program on said tape.

10. The invention in accordance with claim 1, wherein said film strip and said first control means includes means for automatically shutting off said apparatus at the end of said film strip.

11. The invention in accordance with claim 1, wherein said tape playback unit includes a tape-gating means on said chassis means for exposing said record tape to said drive means and said signal pickup means.

12. The invention in accordance with claim 1, wherein said tape playback unit includes a latching means, a record tape guide and drive assembly, said assembly cooperative to guide said record tape and adapted to be operatively connected with said driving means to drive said tape, said control means includes means for shifting said assembly to an operative position at which it is cooperable to guide and drive said record tape, and said latching means being adapted to lock said assembly in an inoperative position.

13. The invention in accordance with claim 1, wherein said chassis means includes means for adjusting said pickup means in three directions.

14. The invention in accordance with claim 1, wherein the tape-driving means includes a driven capstan and an idler roll, and biasing means mounted on said chassis means and coupled to said idler roll for withdrawing said idler roll with respect to said capstan.

References Cited in the file of this patent

UNITED STATES PATENTS

| | | |
|---|---|---|
| 2,575,579 | Bullock et al. | Nov. 20, 1951 |
| 2,631,855 | Kornei | Mar. 17, 1953 |
| 2,699,089 | Jakobs et al. | Jan. 11, 1955 |